(12) United States Patent
Dietz et al.

(10) Patent No.: US 6,475,616 B1
(45) Date of Patent: Nov. 5, 2002

(54) PAINT REPLACEMENT APPLIQUES

(75) Inventors: Timothy M. Dietz, St. Paul; Donald E. Gustafson, Oakdale; Mark D. Weigel, Hugo, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/725,404

(22) Filed: Nov. 29, 2000

Related U.S. Application Data

(60) Provisional application No. 60/192,914, filed on Mar. 29, 2000, and provisional application No. 60/167,991, filed on Nov. 30, 1999.

(51) Int. Cl.$^7$ ............... B32B 15/08; B32B 27/08; B32B 27/30; B32B 27/36; B32B 27/40
(52) U.S. Cl. ............... 428/355 AC; 428/343; 428/354; 428/355 EN; 428/421; 428/422; 428/424.2; 428/424.6; 428/457; 428/461; 428/463; 428/515; 428/520; 428/522
(58) Field of Search ............... 428/343, 354, 428/355 EN, 355 AC, 421, 422, 423.1, 424.2, 429.6, 457, 461, 463, 515, 520, 522

(56) References Cited

U.S. PATENT DOCUMENTS

| | | | |
|---|---|---|---|
| 3,111,450 A | 11/1963 | Stevens | |
| 3,392,128 A | 7/1968 | Hostettler et al. | |
| 3,582,501 A | 6/1971 | Hostettler et al. | |
| 3,836,488 A | 9/1974 | Pruitt et al. | |
| 3,980,579 A | 9/1976 | Syrop et al. | |
| 4,119,585 A | 10/1978 | Kenney et al. | |
| 4,329,384 A | 5/1982 | Vesley et al. | |
| 4,330,590 A | 5/1982 | Vesley | |
| 4,379,201 A | 4/1983 | Heilmann et al. | |
| 4,418,120 A | 11/1983 | Kealy et al. | |
| 4,737,559 A | 4/1988 | Kellen et al. | |
| 4,986,496 A | * 1/1991 | Marentic et al. | ............ 244/130 |
| 5,073,611 A | 12/1991 | Rehmer et al. | |
| 5,089,645 A | 2/1992 | Nichols et al. | |
| 5,132,164 A | 7/1992 | Moriya et al. | |
| 5,133,516 A | 7/1992 | Marentic et al. | |
| 5,424,122 A | 6/1995 | Crandall et al. | |
| 5,506,279 A | 4/1996 | Babu et al. | |
| 5,604,034 A | 2/1997 | Matsuda | |
| 5,660,667 A | * 8/1997 | Davis | ............ 156/242 |
| 5,670,557 A | 9/1997 | Dietz et al. | |
| 5,702,805 A | * 12/1997 | Yin et al. | ............ 156/235 |
| 5,848,769 A | 12/1998 | Fronek et al. | |
| 5,965,256 A | 10/1999 | Barrera | |
| 5,972,176 A | 10/1999 | Kirk et al. | |
| 6,177,189 B1 | 1/2001 | Rawlings et al. | |

FOREIGN PATENT DOCUMENTS

| | | |
|---|---|---|
| WO | WO 99/64235 | 12/1999 |

OTHER PUBLICATIONS

*Polymer Interface and Adhesion*, Souheng Wu, Ed., Marcel Dekker, Inc., NY and Basel, pp. 279–336 (1982).
*Encyclopedia of Polymer Science and Engineering*, Second Edition, Supplemental Volume, John Wiley & Sons, pp. 674–689 (1989).
*Handbook of Pressure Sensitive Adhesive Technology*, Second Edition, D. Satas, ed., Van Nostrand Reinhold, New York, NY, pp. 171–176 (1989).

\* cited by examiner

*Primary Examiner*—Vivian Chen
(74) *Attorney, Agent, or Firm*—Scott A. Bardell

(57) ABSTRACT

An applique is provided that includes a fluoropolymer backing, an adhesive on one of the surfaces of the backing and a urethane coating layer on the other surface of the backing.

27 Claims, No Drawings

PAINT REPLACEMENT APPLIQUES

This application claims the benefit of U.S. Provisional Application No. 60/192,914, filed Mar. 29, 2000, and U.S. Provisional Application No. 60/167,991, filed Nov. 30, 1999.

This invention was made with Government support under Grants/Cooperative Agreement No. 70NANB5H1069 awarded by the National Institute of Standards and Technology, Department of Commerce. The Government may have certain rights in the invention.

FIELD OF THE INVENTION

This invention relates to multilayer films used as appliques, for example, for paint replacement applications.

BACKGROUND OF THE INVENTION

Paint on an aircraft can serve to protect the outer surface as well as to provide decorative features. Paint is applied in a controlled environment to alleviate environmental and health hazards, which results in significantly high costs. Current aircraft paint technology uses large volumes of volatile organic compounds for application and removal, such as methylene chloride and methyl ethyl ketone, and heavy metals, such as chromium. Such materials are potentially hazardous to workers and the environment. As a result, there is a desire to eliminate the need to paint aircraft.

Over the past 30 years, tapes have been used to protect aircraft substrates as an alternative to paint systems. For example, polyurethane tapes have been used to protect aircraft leading edge substrates from damage from rain, sand, sleet, and other airborne particle damage. Cushioned versions of polyurethane tapes have been used to absorb the impact energy of small rocks and debris and provide protection for antennas, fuselage panels, and composite wing flaps. Thin film tapes capable of being printed with graphics have been used for aircraft markings and decals. Such tapes include polymer backings and adhesives that have significant advantages; however, they are typically limited in their applications because few environments are as demanding as the exterior of an aircraft due to temperature variances, fluid exposures, conformance to various contoured and/or complex surfaces, etc. Thus, a need exists for paint replacement technologies that can withstand the harsh environments to which aircraft are exposed while maintaining acceptable film appearance characteristics (specifically, high gloss retention, gouge and scratch resistance) and can be used on the entire surface of the aircraft.

SUMMARY OF THE INVENTION

The present invention provides an applique that comprises a fluorinated polymer backing having two treated surfaces and having an adhesive layer on one treated surface and a cured urethane coating layer on the other treated surface, the cured urethane coating layer comprising urethane polymer and optionally, additives such as colorants, UV absorbers, etc. The adhesive preferably is a pressure-sensitive adhesive which preferably comprises an acrylate copolymer comprising at least one monofunctional alkyl (meth)acrylate monomer (also known as a "repeat unit" when describing a copolymer) and at least one monofunctional free-radically copolymerizable acid-containing reinforcing monomer whose homopolymer glass transition temperature is higher than that of the alkyl (meth)acrylate homopolymer.

In another embodiment of the present invention, an applique comprises a fluorinated polymer backing that is not perfluorinated, an adhesive layer on one treated surface of the backing and a cured urethane coating layer on the other treated surface, the cured urethane coating layer comprising urethane polymer, and optionally, additives such as colorants, UV absorbers, etc. The adhesive is preferably a pressure-sensitive adhesive which preferably comprises an acrylate copolymer comprising at least one monofunctional alkyl (meth)acrylate monomer and at least one monofunctional free-radically copolymerizable acid-containing reinforcing monomer whose homopolymer glass transition temperature is higher than that of the alkyl (meth)acrylate homopolymer.

The present invention also provides an airplane comprising an outer surface and an applique thereon, wherein the applique comprises a fluorinated polymer backing having two treated surfaces, an adhesive layer on one treated surface and a cured urethane coating layer on the other treated surface, the cured urethane coating layer comprising urethane polymer and, optionally additives such as colorants, UV absorbers, etc. The adhesive is preferably a pressure-sensitive adhesive and preferably comprises an acrylate copolymer comprising copolymerized monomers comprising at least one monofunctional alkyl (meth)acrylate monomer and at least one monofunctional free-radically copolymerizable acid-containing reinforcing monomer having a homopolymer glass transition temperature higher than that of the alkyl (meth)acrylate homopolymer.

The appliques of the invention have a gloss retention of greater than or equal to 10 percent, preferably greater than or equal to 30 percent, more preferably greater than or equal to 40 percent, as measured at an angle of 60° with respect to the applique surface and greater than or equal to 30 percent, preferably greater than or equal to 45 percent, more preferably greater than or equal to 60 percent, as measured at an angle of 85° with respect to the applique surface for glossy and semi-glossy surfaces.

Preferably, the initial gloss is greater than 10, more preferably 35 or greater, even more preferably, 40 or greater, and even more preferably 50 or greater when measured at an angle of 60° with respect to the applique surface. The appliques of the invention are also both conformable and removable and exhibit resistance to hydrocarbon fluids. Preferably, the applique of the present invention exhibits resistance to hydraulic fluids and has a film hardness of greater than or equal to 6B.

Appliques of the present invention preferably provide a uniform coating thickness having a tight tolerance; for example, a cured urethane coating layer having a thickness of 52.1 micrometers may have a tolerance of plus or minus 1.5 micrometers. Preferably, the coating thickness of the cured urethane coating layer may range from about 12 micrometers to about 254 micrometers. The adhesive is preferably a pressure-sensitive adhesive which preferably comprises an acrylate copolymer having at least one monofunctional alkyl (meth)acrylate monomer and at least one monofunctional free-radically copolymerizable acid-containing reinforcing monomer whose homopolymer glass transition temperature is higher than that of the alkyl (meth) acrylate monomer.

Advantages of the appliques of the invention include: improved gloss retention and improved gouge and scratch resistance as compared to fluoropolymer backing alone; and the appliques are more easily removable from substrates than conventional paints so that the appearance of the substrate may be changed as desired with less labor than required with conventional paints.

DETAILED DESCRIPTION OF THE PREFERRED EMBODIMENTS

The present invention is directed to appliques, particularly appliques for replacing paint on substrates. Such appliques are useful on vehicles, such as planes, trains, and automobiles, boats, and ships. They can be used on painted, primed (e.g., epoxy primer, chromated primer), or bare surfaces. They can be used on metal surfaces, particularly aluminum surfaces, which can be an anodized surface, a chromate-treated surface (which results from treatment with Alodine 1200, available from Amchem Products, Inc., Abmoler, Pa., or otherwise treated surface. They can be used on surfaces of composite materials, such as carbon fiber reinforced plastics, for example.

The appliques of the present invention can be in a variety of shapes, sizes, and thicknesses. They can be in the form of sheet materials or they can be in the form of three-dimensional shaped articles, such as a thermal-formed boot. Such three-dimensional shaped appliques can be used on the wingtip or nose of an airplane, for example. If in the form of a sheet material, the applique typically has a thickness of about 12–760 micrometers, whereas if in the form of a three-dimensional object, the applique typically has a thickness of about 170–760 micrometers.

The appliques of the present invention can be used as decals and decorative appliques or they can be used as protective appliques to reduce corrosion, gouge, and scratch damage, for example. They can be used in multiple layers, such as a protective applique over a decal or a decal over a protective applique, for example. Significantly, the appliques of the present invention can be used to completely cover the exterior surface of a vehicle, such as an airplane, as a replacement for paint, as a protective coating over paint, or as a coating under paint. They can be applied such that the edges of the appliques overlap or form butt joints.

Appliques of the present invention exhibit a glossy appearance and provide excellent gloss retention over the range of glossy and semi-glossy surfaces. By this, it is meant that an applique of the present invention has an initial gloss of greater than 10 when measured at an angle of 60°, and a gloss retention of greater than or equal to 10 percent as measured at an angle of 60° and greater than or equal to 30 percent as measured at an angle of 85°, both angles being with respect to the surface of the applique. As used herein, the term "glossy" is used to encompass both semi-glossy and glossy appearing surfaces. Such surfaces are defined as those that exhibit an initial gloss value of greater than 10 when measured at an angle of 60°. A glossy surface may be described as one having luster or brightness. Semi-glossy may be described as between glossy and or matte. A flat surface may be described as free from gloss. A matte surface may be described as a surface having an initial gloss of 10 or less when measured at an angle of 60°.

The appliques of the invention also preferably have a film hardness of greater than or equal to 6B and are both conformable and removable.

The appliques of the present invention are stable under a wide variety of environmental conditions, including wide ranges of temperature and humidity, and when exposed to moisture and fluids. That is, the appliques of the present invention are preferably conformable, fluid-resistant, and adhere well to a variety of surfaces under a variety of conditions. As used herein, a "conformable" applique is one that can be applied to various contoured and/or complex surfaces and maintains intimate contact with the entire surface for the time required for the desired application. Preferably, a conformable applique passes the conformability test described in the examples below.

Appliques of the present invention are also resistant to hydrocarbon fluids (e.g., jet fuel). Preferably appliques of the present invention have a peel strength of at least about 30 N/100 mm at room temperature after being applied to an aluminum substrate and immersed in a hydrocarbon fluid for 14 days at room temperature. More preferably, the peel strength is at least about 35 N/100 mm, after such exposure.

Preferably, appliques of the present invention are also resistant to phosphate ester hydraulic fluids (e.g., SKYDROL hydraulic fluid). Preferably, appliques of the present invention have a peel strength of at least about 25 N/100 mm at room temperature after being applied to an aluminum substrate and immersed in a phosphate ester hydraulic fluid for 30 days at room temperature. More preferably, the peel strength is at least about 35 N/100 mm after such exposure.

The appliques of the present invention are expected to exhibit the hydrocarbon and hydraulic fluid resistance described above based on the performance of the applique constructions described in WO 99/64235, filed Jun. 6, 1998.

Preferably, appliques of the present invention exhibit significant peel strength at low temperatures. By this it is meant that an applique of the present invention has a peel strength of at least about 30 N/100 mm at −51° C. More preferably, the peel strength is at least about 40 N/100 mm, and even more preferably, the peel strength is at least about 60 N/100 mm at −51° C.

An applique according to the present invention includes a backing having both major surfaces treated and having an adhesive layer, preferably, a pressure-sensitive adhesive layer, on the first major treated surface and a urethane coating layer on the second major treated surface. The backing includes a fluorinated polymer, preferably, one that is not perfluorinated. The pressure-sensitive adhesive preferably includes an acrylate copolymer, preferably, a crosslinked acrylate copolymer. Significantly, and surprisingly, appliques of the present invention can withstand the harsh environments to which aircraft are exposed while retaining high gloss and preventing gouge and scratch damage and are also conformable and removable. This allows the applique of the present invention to be used on the entire surface of an aircraft.

Backing

Backings of the appliques of the present invention include one or more fluorinated polymers. Herein, a polymer includes homopolymers and copolymers. Copolymers include polymers containing two or more different monomers, including terpolymers, tetrapolymers, etc. Preferably, the fluorinated polymers are prepared from olefinically unsaturated monomers. Also, preferably, the fluorinated polymers are not perfluorinated. That is, although they may be made from perfluorinated monomers, the resultant polymers have both C—H and C—F bonds, for example.

Preferably, fluorinated polymers suitable for use in making backings for appliques of the present invention are those that form conformable, fluid-resistant sheet materials. As used herein, a "conformable" backing is one that can be applied to various contoured and/or complex surfaces and maintains intimate contact with the entire surface for the time required for the desired application. Preferably, a conformable backing passes the conformability test described in the examples below.

One class of useful fluorinated polymers include interpolymerized units derived from vinylidene fluoride (also referred to as "$VF_2$" or "VDF"). Such materials typically include at least about 3 weight percent of interpolymerized units derived from $VF_2$, which may be homopolymers or copolymers with other ethylenically unsaturated monomers, such as hexafluoropropylene ("HFP"), tetrafluoroethylene ("TFE"), chlorotrifluoroethylene ("CTFE"), 2-chloropentafluoropropene, perfluoroalkyl vinylethers, perfluorodiallylether, perfluoro-1,3-butadiene, and the like. Such fluorine-containing monomers may also be copolymerized with fluorine-free terminally unsaturated olefinic comonomers, such as ethylene or propylene. Preferred such fluoropolymers include tetrafluoroethylene-hexafluoropropylene-vinylidene fluoride terpolymers and hexafluoropropylene-vinylidene fluoride copolymers. Commercially available fluoropolymer materials of this type include, for example, THV 200, THV 400, and THV 500 fluoropolymers, which are available from Dyneon (a wholly owned subsidiary of Minnesota Mining and Manufacturing Company), Oakdale, Minn., and SOLEF 11010, which is available from Solvay Polymers Inc., Houston, Tex.

Another class of useful fluorinated polymers include interpolymerized units derived from one or more of hexafluoropropylene ("HFP"), tetrafluoroethylene ("TFE"), chlorotrifluoroethylene ("CTFE"), and/or other perhalogenated monomers and further derived from one or more hydrogen-containing and/or non-fluorinated olefinically unsaturated monomers. Useful olefinically unsaturated monomers include alkylene monomers, such as ethylene, propylene, 1-hydropentafluoropropene, 2-hydropentafluoropropene, etc. A preferred such fluoropolymer is a copolymer of poly(tetrafluoroethylene) and ethylene. Commercially available fluoropolyiner materials of this type include, for example, TEFZEL LZ300 fluoropolymers, which is available from DuPont Films, Buffalo, N.Y.

Other useful fluorinated polymers, preferably nonperfluorinated polymers, include poly(vinylfluoride), such as TEDLAR TAW15AH8, which is available from DuPont Films. Blends of fluoropolymers can also be used to make the backings for the appliques of the present invention. For example, blends of two different types of nonperfluorinated fluoropolymers can be used, as well as blends of a nonperfluorinated fluoropolymer with a perfluorinated fluoropolymer. Furthermore, blends of fluoropolymers with nonfluoropolymers, such as polyurethane and polyethylene, for example, can also be used, as long as one of the polymers in the blend is a fluoropolymer, and the nonfluoropolymer is used in a minor amount. Fluoropolymer backings for use in the present invention can be made using a variety of methods, including cast and extrusion methods, preferably, however, they are extruded.

The backings are typically in the form of sheet materials having two major surfaces. Typically, both of the surfaces are treated to allow for bonding of the adhesive and urethane layer. Such treatment methods include corona treatment, particularly corona discharge in an atmosphere containing nitrogen, or nitrogen and hydrogen, as disclosed in U.S. Pat. No. 5,972,176 (Seth et al.). Another useful treatment method includes a chemical etch using sodium naphthalenide. Such treatment methods are disclosed in *Polymer Interface and Adhesion*, Souheng Wu, Ed., Marcel Dekker, Inc., NY and Basel, pages 279–336 (1982), and *Encyclopedia of Polymer Science and Engineering*, Second Edition, Supplemental Volume, John Wiley & Sons, pages 674–689 (1989). Another useful treatment method is the FLUOROTECH process, available from Acton Industries, Inc., Pittston, Pa. Other treatment methods include the use of such materials as primers. These may be employed either in place of, or in addition to the surface treatments described above. An example of a useful primer is ADHESION PROMOTER #86A (a liquid primer, available from Minnesota Mining and Manufacturing Company, St. Paul, Minn.)

Treatment conditions are sufficient if a peel adhesion strength of 30 N/100 mm is obtained when tested at a temperature of −51° C. as described in "Peel Adhesion Strength (Method B)" below.

The backings may be clear and colorless, or preferably include a colorant, such as a pigment or dye. Preferably, the colorant is an inorganic pigment, such as those disclosed in U.S. Pat. No. 5,132,164 (Moriya et al.). The pigment may be incorporated into one or more non-fluorinated polymers, which can be blended with one or more fluorinated polymers.

Adhesive

The backing of the present invention may be adhered to a substrate using adhesives such as room temperature pressure-sensitive adhesives (PSA), hot melt PSAs, or thermoplastics. Preferably, the adhesive is a room temperature PSA. An example of a room temperature PSA is an acrylate pressure-sensitive adhesive. Such materials possess a fourfold balance of adhesion, cohesion, stretchiness, and elasticity, and a glass transition temperature ($T_g$) of less than about 20° C. Thus, they are tacky to the touch at room temperature (e.g., about 20° C. to about 25° C.), as can be determined by a finger tack test or by conventional measurement devices, and can easily form a useful adhesive bond with the application of light pressure. An acceptable quantitative description of a pressure-sensitive adhesive is given by the Dahlquist criterion line (as described in the *Handbook of Pressure Sensitive Adhesive Technology*, Second Edition, D. Satas, ed., Van Nostrand Reinhold, New York, N.Y., pages 171–176 (1989)), which typically indicates that materials having a storage modulus (G') of less than about $3 \times 10^5$ Pascals (measured at 10 radian/second at a temperature of about 20° C. to about 22° C.) have pressure-sensitive adhesive properties while materials having a G' in excess of this value do not. As stated above, the acrylate pressure-sensitive adhesive copolymers used herein are surprisingly advantageous because they show desirable adhesive properties over a broad temperature range, particularly at low temperatures, to a wide variety of substrates. In addition, they show desirable adhesive properties even after exposure to various fluids.

Preferred poly(acrylates) are derived from: (A) at least one monofunctional alkyl (meth)acrylate monomer (i.e., alkyl acrylate and alkyl methacrylate monomer); and (B) at least one monofunctional free-radically copolymerizable acid-containing reinforcing monomer. The reinforcing monomer has a homopolymer glass transition temperature ($T_g$) higher than that of the alkyl (meth)acrylate homopolymer and is one that increases the glass transition temperature and modulus of the resultant copolymer. Herein, "copolymer" refers to polymers containing two or more different monomers, including terpolymers, tetrapolymers, etc.

Preferably, the monomers used in preparing the pressure-sensitive adhesive copolymers of the present invention include: component (A)—a monofunctional alkyl (meth) acrylate monomer that, when homopolymerized, generally has a glass transition temperature of no greater than about 0° C.; and component (B)—a monofunctional free-radically copolymerizable acid-containing reinforcing monomer that, when homopolymerized, generally has a glass transition temperature of at least about 10° C. The glass transition temperatures of the homopolymers of monomers A and B are typically accurate to within ±5° C. and are measured by differential scanning calorimetry.

Monomer A, which is a monofunctional alkyl acrylate or methacrylate (i.e., (meth)acrylic acid ester), contributes to the flexibility and tack of the copolymer. Preferably, monomer A has a homopolymer $T_g$ of no greater than about 0° C. Preferably, the alkyl group of the (meth)acrylate has an average of about 4 to about 20 carbon atoms, and more preferably, an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, isooctyl acrylate, n-decyl acrylate, isodecyl acrylate, isodecyl methacrylate, and isononyl acrylate. Other examples include, but are not limited to, polyethoxylated or -propoxylated methoxy (meth)acrylate (i.e., poly(ethylene/propylene oxide) mono-(meth)acrylate) macromers (i.e., macromolecular monomers), polymethylvinyl ether mono(meth)acrylate macromers, and ethoxylated or propoxylated nonyl-phenol acrylate macromers. The molecular weight of such macromers is typically about 100 grams/mole to about 600 grams/mole, and preferably, about 300 grams/mole to about 600 grams/mole. Preferred monofunctional (meth)acrylates that can be used as monomer A include 2-methylbutyl acrylate, isooctyl acrylate, lauryl acrylate, and poly(ethoxylated) methoxy acrylate (i.e., methoxy terminated poly(ethylene glycol) mono-acrylate or poly(ethyleneoxide) monomethacrylate). Combinations of various monofunctional monomers categorized as an A monomer can be used to make the pressure-sensitive copolymer used in making the appliques of the present invention.

Monomer B, which is a monofunctional free-radically copolymerizable acid-containing reinforcing monomer increases the glass transition temperature of the copolymer. As used herein, "reinforcing" monomers are those that increase the modulus of the adhesive, and thereby its strength. Preferably, monomer B has a homopolymer $T_g$ of at least about 10° C. As used herein, "acid-containing" monomers are those that include acid functionality such as an acrylic acid or a methacrylic acid functionality. Examples of monomer B include, but are not limited to, acrylic acid and methacrylic acid, itaconic acid, crotonic acid, maleic acid, and fumaric acid. A preferred reinforcing monofunctional acrylic monomer that can be used as monomer B includes acrylic acid and methacrylic acid. Combinations of various reinforcing monofunctional monomers categorized as a B monomer can be used to make the copolymer used in making the protective appliques of the present invention.

Optionally, if desired, the copolymer can also include a monofunctional free-radically copolymerizable neutral or nonpolar reinforcing monomer in addition to the acid-containing monomer. Examples of such monomers include, but are not limited to, 2,2-(diethoxy)ethyl acrylate, hydroxyethyl acrylate or methacrylate, 2-hydroxypropyl acrylate or methacrylate, methyl methacrylate, isobutyl acrylate, n-butyl methacrylate, norbornyl acrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, and N-vinyl pyrrolidone. Combinations of such neutral reinforcing monofunctional monomers can be used to make the copolymer used in making the appliques of the present invention.

The acrylate copolymer is preferably formulated to have a resultant $T_g$ of less than about 25° C. and more preferably, less than about 0° C. Such acrylate copolymers preferably include about 80 weight percent to about 96 weight percent of at least one alkyl (meth)acrylate repeat unit and about 4 weight percent to about 20 weight percent of at least one copolymerizable acid-containing reinforcing repeat unit. More preferably, the acrylate copolymers about 85 weight percent to about 95 weight percent of at least one alkyl (meth)acrylate repeat unit and about 6 weight percent to about 15 weight percent of at least one copolymerizable acid-containing reinforcing repeat unit. These weight percentages are based on the total weight of the monomers.

One or more nonionic crosslinking agents that may, or may not, be copolymerizable with monomers A and B, can be used in the pressure-sensitive adhesives of the appliques of the present invention if desired. A crosslinking agent is referred to herein as component C. Typically, component C modifies the adhesion of the pressure-sensitive adhesive and improves its cohesive strength. The crosslinking agent typically produces chemical crosslinks (e.g., covalent bonds). Prior to application of the applique to a substrate, the crosslinking functionality is consumed, i.e., it is essentially completely reacted with monomers A and B or copolymers thereof.

When component C contains ethylenic unsaturation, it is incorporated into the backbone of the copolymer by copolymerization with monomers A and B through the ethylenic unsaturation. Such crosslinking agents are disclosed in U.S. Pat. No. 4,379,201 (Heilmann et al.); U.S. Pat. No. 4,737,559 (Kellen et al.); U.S. Pat. No. 5,073,611 (Rehmer et al.); and U.S. Pat. No. 5,506,279 (Babu et al.). Alternatively, component C can be essentially independent of the polymeric backbone. Materials of this type can cause crosslinking by, for example, reaction with the pendant carboxylic acid group of monomer B as disclosed in U.S. Pat. No. 5,604,034 (Matsuda), or by photoactivated hydrogen abstraction as disclosed in U.S. Pat. No. 4,330,590 (Vesley) and U.S. Pat. No. 4,329,384 (Vesley). Matsuda discloses the use of multifunctional crosslinking agents whose functionalities are reactive with carboxylic acid groups, while Vesley describes additives that can cause crosslinking upon exposure to ultraviolet radiation (e.g., radiation having a wavelength of about 250 nanometers to about 400 nanometers).

Preferably, component C is (1) a copolymerizable olefinically unsaturated compound, which, in the excited state, is capable of abstracting hydrogen; (2) a compound having at least two reactive functional groups reactive with carboxylic acid groups; or (3) a noncopolymerizable compound which, in the excited state, is capable of abstracting hydrogen. Component C1 is a free-radically polymerizable monomer capable of polymerizing with monomers A and/or B. Components C2 and C3 are essentially free of olefinic unsaturation and thus typically not copolymerizable with monomers A and/or B. Combinations of various crosslinking agents can be used to make the pressure-sensitive adhesive of the present invention.

One type of nonionic crosslinking agent (i.e., component C1) is an olefinically unsaturated compound that is copolymerized with monomers A and B and generates free radicals on the polymer upon irradiation of the polymer. Examples of such a compound include an acrylated benzophenone as described in U.S. Pat. No. 4,737,559 (Kellen et al.), p-acryloxy-benzophenone, which is available from Sartomer Company, Exton, Pa., and monomers described in U.S. Pat. No. 5,073,611 (Rehmer et al.) including p-N-(methacryloyl4-oxapentamethylene)-carbamoyloxybenzophenone, N-(benzoyl-p-phenylene)-N'-(methacryloxymethylene)-carbodiimide, and p-acryloxy-benzophenone. U.S. Pat. No. 5,506,279 (Babu et al.) at columns 5–6, describes another suitable olefinically unsaturated crosslinking agent referred to therein as Formula 2, which is {2-[4-(2-hydroxy-2-methyl-propan-1-one)phenoxy]}ethyl(2-methyl-2-(2-methyl-2-propen-1-one)amino)propanoate. The olefinically unsaturated compound which, in the excited state, is capable of abstracting hydrogen preferably includes acrylic functionality. Combinations of such crosslinking agents can be used to make the pressure-sensitive adhesive used in the present invention.

A second type of nonionic crosslinking agent (i.e., component C2) is a crosslinking compound which is essentially free of olefinic unsaturation and is capable of reacting with the carboxylic acid groups of monomer B. It includes at least two functional groups reactive with carboxylic acid groups. It may be added to a mixture of monomers A and B prior to their polymerization, or after they have been formed into a partially polymerized syrup, or to a copolymer of monomers A and B. Examples of such components include, but are not limited to, 1,4-bis(ethyleneiminocarbonylamino)benzene; 4,4-bis(ethyleneiminocarbonylamino)diphenylmethane; 1,8-bis(ethyleneiminocarbonylamino)octane; 1,4-tolylene diisocyanate; and 1,6-hexamethylene diisocyanate as described in U.S. Pat. No. 5,604,034 (Matsuda). Another example is N,N'-bis-1,2-propyleneisophthalamide as described in U.S. Pat. No. 4,418,120 (Kealy et al.). Other such crosslinking agents are available from K. J. Quin and Co., Seabrook, N.H., and EIT Inc., Lake Wyllie, S.C. Other examples of C2 crosslinking agents include diepoxides, dianhydrides, bis(amides), and bis(imides). Combinations of such crosslinking agents can be used to make the pressure-sensitive adhesive used in the present invention.

A third type of nonionic crosslinking agent (i.e., component C3) is a compound which is essentially free of olefinic unsaturation, is noncopolymerizable with monomers A and B, and, in the excited state, is capable of abstracting hydrogen. It is added to a copolymer of monomers A and B, or a partially polymerized syrup of monomers A and B. Upon irradiation of the mixture, component C3 generates free radicals on the polymer or partially polymerized material. Examples of such components include, but are not limited to, 2,4-bis(trichloromethyl)-6-(4-methoxy)phenyl)-s-triazine; 2,4-bis(trichloromethyl)-6-(3,4-dimethoxy) phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxy)phenyl)-s-triazine as described in U.S. Pat. No. 4,330,590 (Vesley), and 2,4-bis(trichloromethyl)-6-naphthenyl-s-triazine and 2,4-bis(trichloromethyl)-6-(4-methoxy)naphthenyl-s-triazine as described in U.S. Pat. No. 4,329,384 (Vesley). Combinations of such crosslinking agents can be used to make the pressure-sensitive adhesive used in the present invention.

Another type of crosslinking agent that can be used in addition to one or more of components C1–C3, is an acrylic crosslinking monomer (component C4) containing at least two acrylic moieties, which preferably has an average of less than about 12 atoms in the chain between acrylic groups. Examples of this type of crosslinking agent include, but are not limited to, trimethylolpropane triacrylate, 1,6-hexanediol diacrylate, pentaerythritol tetraacrylate, 1,2-ethylene glycol diacrylate, dodecyl diacrylate, and the diacrylate of ethylene oxide modified bisphenol A.

If used, the crosslinking agent is used in an effective amount, by which is meant an amount that is sufficient to cause crosslinking of the pressure-sensitive adhesive to provide adequate cohesive strength to produce the desired final adhesion properties to the substrate of interest. Preferably, if used, the crosslinking agent is used in an amount of about 0.01 part to about 2 parts by weight, based on 100 parts of the copolymer.

If a photocrosslinking agent has been used, the adhesive can be exposed to ultraviolet radiation having a wavelength of about 250 nm to about 400 nm. The radiant energy in this preferred range of wavelength required to crosslink the adhesive is about 100 millijoules/centimeter$^2$ (mJ/cm$^2$) to about 1,500 mJ/cm$^2$, and more preferably, about 200 mJ/cm$^2$ to about 800 mJ/cm$^2$.

Preparation of Acrylate Copolymers

The acrylate pressure-sensitive adhesives of the present invention can be synthesized by a variety of free-radical polymerization processes, including solution, radiation, bulk, dispersion, emulsion, and suspension polymerization processes. Polymerization of the monomers to form the copolymer useful in the pressure-sensitive adhesive composition of the present invention is typically carried out using thermal energy, electron-beam radiation, ultraviolet radiation, and the like. Such polymerizations can be facilitated by a polymerization initiator, which can be a thermal initiator or a photoinitiator. Examples of suitable photoinitiators include, but are not limited to, benzoin ethers such as benzoin methyl ether and benzoin isopropyl ether, substituted benzoin ethers such as anisoin methyl ether, substituted acetophenones such as 2,2-dimethoxy-2-phenylacetophenone, and substituted alpha-ketols such as 2-methyl-2-hydroxypropiophenone. Examples of commercially available photoinitiators include IRGACURE 651 and DAROCUR 1173, both available from Ciba-Geigy Corp., Hawthorne, N.Y., and LUCERIN TPO from BASF, Parsippany, N.J. Examples of suitable thermal initiators include, but are not limited to, peroxides such as dibenzoyl peroxide, dilauryl peroxide, methyl ethyl ketone peroxide, cumene hydroperoxide, dicyclohexyl peroxydicarbonate, as well as 2,2-azo-bis(isobutryonitrile), and t-butyl perbenzoate. Examples of commercially available thermal initiators include VAZO 64, available from ACROS Organics, Pittsburgh, Pa., and LUCIDOL 70, available from Elf Atochem North America, Philadelphia, Pa. The polymerization initiator is used in an amount effective to facilitate polymerization of the monomers. Preferably, the polymerization initiator is used in an amount of about 0.1 part to about 5.0 parts by weight, and more preferably, about 0.2 part to about 1.0 part by weight, based on 100 parts of the copolymer.

If a photocrosslinking agent is used, the coated adhesive can be exposed to ultraviolet radiation having a wavelength of about 250 nm to about 400 nm. The radiant energy in this preferred range of wavelength required to crosslink the adhesive is about 100 millijoules/cm$^2$ to about 1,500 millijoules/cm$^2$, and more preferably, about 200 nmillijoules/cm$^2$ to about 800 millijoules/cm$^2$.

The copolymers of the present invention can be prepared by a variety of techniques, which may or may not include solvent or chain transfer agents (e.g., CBr$_4$) to control molecular weight. These techniques may involve the use of appropriate polymerization initiators. A preferred solvent-free polymerization method using monomers A, B, and a crosslinking agent is disclosed in U.S. Pat. No. 4,379,201 (Heilmann et al.). Initially, a mixture of monomers A and B is polymerized with a portion of a photoinitiator by exposing the mixture to UV radiation in an inert environment for a time sufficient to form a coatable base syrup, and subsequently adding a crosslinking agent and the remainder of the photoinitiator. This final syrup containing a crosslinking agent (e.g., having a Brookfield viscosity of about 100 centipoise to about 6000 centipoise at 23° C., as measured with a No. 4 LTV spindle, at 60 revolutions per minute) is then coated onto a substrate, such as a backing. Once the syrup is coated onto a backing, further polymerization and crosslinking is typically carried out in an inert environment (i.e., an environment that is nonreactive with the monomer mixture). Suitable inert environments include nitrogen, carbon dioxide, helium, and argon, which exclude oxygen. A sufficiently inert atmosphere can be achieved by covering a layer of the photoactive syrup with a polymeric film, such as silicone-treated polyethylene terephthalate (PET) film, that is transparent to UV radiation or e-beam and irradiating through the film in air.

A preferred solution polymerization method for preparing a copolymer using monomers A, B, and optionally a crosslinking agent is disclosed in U.S. Pat. No. 5,073,611 (Rehmer et al.). Suitable solvents for such preparation methods include, for example, hydrocarbons such as benzene, toluene, xylene, normal hexanes, cyclohexane, as well as esters, alcohols, ethers, and mixtures thereof. For carrying out the polymerization in solution, some or all of the solvent is heated with some of the monomer mixture and some or all of the thermal initiator. When the polymerization begins, the remainder of the monomer mixture, and where relevant, the remainder of the thermal initiator and the solvent are added. After polymerization, the composition can be coated onto a backing and the solvent can be removed by evaporation with or without heat.

A latex polymerization method for preparing a copolymer using monomers A, B, and a crosslinking agent, is disclosed in U.S. Pat. No. 5,424,122 (Crandall et al.). For example, a latex emulsion polymerization is carried out by combining monomers A, B, and a crosslinking agent, an oleophilic nonionic free radical initiator, water, and a nonionic surfactant. The mixture is homogenized to form an emulsion followed by initiation of free radical polymerization, typically done using heat, while agitating the emulsion under an inert atmosphere. After polymerization, the latex can be coated onto a solid substrate and dried, typically at a temperature of at least about 65° C. If necessary, water can be added or removed to reach an appropriate coating viscosity.

A pressure-sensitive adhesive composition may then be applied to the backing by a variety of coating methods including knife coating, slotted knife coating, or reverse roll coating. If the composition includes a solvent, it is then dried at a temperature (e.g., about 65° C. to about 120° C.) and a time (e.g., several minutes to about one hour) so as to provide an adhesive applique. The thickness of the layer of adhesive may vary over a broad range of about 10 micrometers to several hundred micrometers (e.g., about 200 micrometers).

Once the adhesive composition has been substantially fully cured and optionally crosslinked so as to provide an applique, the adhesive surface of the applique may, optionally, be protected with a temporary, removable release liner (i.e., protective liner) such as a paper liner or plastic films such as polyolefin (e.g., polyethylene or polypropylene) or polyester (e.g., polyethylene terephthalate) film. Such paper or films may be treated with a release material such as silicones, waxes, fluorocarbons, and the like. Only after the adhesive composition has been substantially fully cured and optionally crosslinked such that there is substantially no unsaturation are the adhesive appliques of the present invention applied to a substrate.

Optional Adhesive Additives

The acrylate pressure-sensitive adhesive compositions used in the appliques of the present invention can include conventional additives such as tackifiers, plasticizers, flow modifiers, neutralizing agents, stabilizers, antioxidants, fillers, colorants, and the like, as long as they do not interfere with the fluid resistance of the adhesive. Initiators that are not copolymerizable with the monomers used to prepare the acrylate copolymer can also be used to enhance the rate of polymerization and/or crosslinking. Such additives can be used in various combinations. If used, they are incorporated in amounts that do not materially adversely affect the desired properties of the pressure-sensitive adhesives or their fiber-forming properties. Typically, these additives can be incorporated into these systems in amounts of about 0.05 weight percent to about 25 weight percent, based on the total weight of the acrylate based pressure-sensitive adhesive composition.

Urethane Coating Layer

The cured urethane coating layers on the appliques of the present invention are made from the reaction products of a hydroxy-containing material (base material) and isocyanate-containing material (activator) for example, polyisocyanate. The curable compositions having the hydroxy- and isocyanate-containing materials may also further comprise a colorant. The curable compositions usually contain solvents and may also further contain other additives such as UV stabilizers, antioxidants, corrosion inhibitors, curing catalysts, and the like.

Useful stoichiometric ratios, based on equivalent weights, of isocyante: hydroxyl functionality are from 2.1:1 to 0.5:1, preferably from 2.1:1 to 1:1, and more preferably from 2.1:1 to 1.4:1.

The curing process can be accelerated by the addition of an appropriate catalyst. In general, such catalysts include heavy metal organic compounds; for example, dibutyl tin malate, dibutyl tin dilaurate, and naphthenate or octoate salts of heavy metals such as tin, lead, bismuth, cobalt, and manganese. Other suitable catalysts include tertiary amines and other nitrogen containing materials such as N-alkyl morpholines, N-alkyl aliphatics polyamines, N-alkyl piperazines, and triethylene diamine.

Inorganic and organic tin compounds are among the most effective catalysts for the reaction of isocyanates with hydroxyl-containing materials particularly alcohols and polyols. Tin compounds frequently employed for this purpose include stannous 2-ethylhexanoate (also referred to as stannous octoate), dibutyl tin dilaurate, dibutyl tin-bis (dodecyl mercaptan) and dibutyl tin oxide (DBTO). Other typical organotin compounds employed or proposed for use as catalysts or co-catalysts in urethane forming reactions are disclosed for example, in U.S. Pat. Nos. 3,582,501; 3,836,488; and 4,119,585. U.S. Pat. No. 3,392,128 discloses the use of dibutyl tin sulfonamide and U.S. Pat. No. 3,980,579 discloses a number of dialkyl tin thio-carboxylates. U.S. Pat. No. 5,089,645 discloses hydroxyl-containing organotin compounds useful as catalysts for the reaction of polyols and diisocyanates. Examples of commercially available catalysts useful in the present invention include FASCAT™ 4202 and FASCAT™ 4224 catalysts (both available from Atochem North America, Philadelphia, Pa.); and DABCO™ T1 and DABCO™ T12 catalysts (both available from Air Products and Chemicals, Inc., Allentown, Pa.). Useful amounts of catalysts typically range from 0 to about 800 ppm, depending on the formulation.

When dried and cured, the urethane coating layer provides a conformable urethane coating layer that has improved gloss retention and gouge and scratch resistance as compared to, for example, a fluoropolymer layer alone. Examples of useful commercially available urethane paints include a mixture of AWL Grip® #2 High Solids Polyurethane Topcoat Gloss and Hi-Cat #85 L/F Converter for High Solids Topcoats, available from U.S. Paint Corporation and DESOTHANE HS from Courtaulds Aerospace. Useful amounts of catalysts for the above commercially available urethane paints are from 0 to about 800 ppm and from about 250 to about 750 ppm respectively.

Preparation of Appliques

Appliques of the present invention can be prepared using standard film-forming and adhesive-coating techniques. Typically, a fluoropolymer is extruded onto a carrier, such as polyethylene terephthalate film to form a backing. The backing is then allowed to cool and solidify. The exposed surface of the backing is then treated to enhance adhesion of a pressure-sensitive adhesive layer. A layer of pressure-sensitive adhesive is then applied to the treated surface of the backing. A wide variety of coating techniques can be used, such as knife coating, roll coating, fluid bearing die, etc. The adhesive can also be applied using solvent cast techniques, for example. Alternatively, a layer of adhesive could be laminated to the backing. Thus, the adhesive can be polymerized first and then applied to the backing or it can be applied as a prepolymer and cured while on the backing. A release liner can be applied over the adhesive layer as described above. In some processes, it may be desirable to cure the adhesive through the release liner. The carrier for the backing is removed, and the exposed surface of the backing treated as described above to enhance adhesion to a urethane coating layer. The urethane coating layer may be applied using the same methods as described above for the application of the PSA. If the urethane layer is cured prior to application to the treated surface of the fluoropolymer backing, then PSA compositions described herein may be used to adhere the urethane layer to the fluoropolymer backing.

The outer exposed surface of the applique construction of the present invention may be provided with a patterned structure. Such patterned structures are useful for reducing fluid (e.g., air, water) drag resistance over and/or across the exposed surface. Such patterned structures and means of providing them are taught in U.S. Pat. No. 5,133,516 (Marentic and Morris) and U.S. Pat. No. 5,848,769 (Fronek and Kryzer). For example, a polymeric sheet (also referred to as a liner) having an embossed structured pattern on one surface may be laminated to the exposed surface of an applique having thereon a not yet cured urethane coating layer such that the urethane coating is in contact with the structured pattern. The urethane coating layer is subsequently cured with the liner in place, followed by removal of the liner prior to use of the applique. The result is an applique with a cured outer layer of polyurethane whose exposed surface contains the reverse image of the embossed structured pattern of the liner.

EXAMPLES

Applique Test Coupon Preparation

Test coupons were prepared in the following manner. A 7.6 cm×11.4 cm×0.063 cm aluminum coupon (2024-T3, available from Q-Panel Lab Products, Cleveland, Ohio) was washed three times with isopropyl alcohol prior to use. A piece of 3M Scotch Brand 898 High Performance Tape (available from Minnesota Mining and Manufacturing Company, St. Paul, Minn.), measuring 2.54 cm×11.4 cm, was wrapped around one longitudinal edge of the coupon such that each opposing surface of the coupon was covered with about 1.2 cm of the tape. Three 2.54 cm×15.2 cm test strips of an applique were then provided and the release liner was removed from them. The test strips were applied across the width (7.6 cm) of the washed aluminum coupon using two passes of a 2 kg hard rubber roller; this left 7.6 cm of each test strip hanging over the taped longitudinal edge. This resulted in an 8.8 cm tab portion, which encompassed the 1.2 cm width of the taped longitudinal edge and the 7.6 cm section of the test strip overhanging the edge of the coupon, for each test strip. 3M Scotch Brand 898 High Performance Tape having dimensions equal to that of the tab was adhered to the back of each tab to prevent stretching of the tab during testing.

Test Methods

Conformability

This test was used to evaluate the conformability of the applique of the present invention. Two 7.62 cm×25.4 cm bare aluminum panels having a thickness of 1 mm were placed one over the other to provide a 5.08 cm×25.4 cm overlap. The panels were riveted together using one row of MS20470 AN470-5-4 Universal Head rivets (as described on page 64, Standard Aircraft Handbook, $5^{th}$ Edition) down the center and along the length of the overlap section. The rivets were spaced 2.54 cm apart from each other and the resultant test panel typically had 9 rivets. One test strip measuring 4 cm×5 cm was cut from a sheet of the applique and the PSA release liner was removed. The test strip was applied by hand, in the lengthwise direction, to the riveted aluminum panels such that the test strip covered 2 rivets. The strip was rubbed down to ensure intimate contact with the panel and rivets using finger pressure and/or a flat piece of flexible plastic. If necessary, a pinhole puncture was made through the applique to relieve any entrapped air. After 48 hours at room temperature, the test strip was visually evaluated with the unaided eye for conformability as determined by the absence of cracking or wrinkling. Those examples which did not exhibit cracking or wrinkling were graded as a "Pass".

Peel Adhesion Strength

Method A

Coupons having applique test strips thereon were evaluated for peel adhesion strength at room temperature (24° C.). Specifically, coupons prepared as described in "Applique Test Coupon Preparation" above were tested according to PSTC-1 (11/75) and further described in U.S. Pat. No. 5,670,557 (Dietz et al). After a 72-hour dwell at room temperature (approximately 24° C.), the tab end of each strip was lifted to expose the taped longitudinal edge of the coupon. The taped longitudinal edge of the coupon was then clamped in the jaws of a tensile testing machine (Instron Universal Testing Instrument Model #4201 equipped with a 1 kN Static Load Cell, available from Instron Company Corporation, Canton, Mass.). The tab of the test strip was attached to the load cell and peeled at an angle of 180° and at a rate of 30.5 cm/minute. The peel adhesion force required to remove the test strip from the aluminum coupon was recorded in ounces and the average value between 5.1 and 7.6 cm was taken. Three test strips were evaluated, and the results combined to give an average value in ounces/inch which was converted and normalized to Newtons/100 mm.

Method B

Test coupons having applique test strips thereon were prepared and evaluated as described in Method A above with the following modifications. The tensile testing machine was equipped with an Instron Environmental Chamber System, Model #3116. Each test coupon was cooled down to −51° C. and equilibrated at that temperature for 10 minutes. After equilibration, a peel force was applied. All samples tested exhibited a peak peel adhesion strength of at least 135 N/100 mm before failing. The location, i.e., interface, of failure varied for each sample. The average peak peel adhesion strength (3 measurements) was reported in Newtons/100 mm.

Gloss Retention

The gloss characteristics of the applique of the invention were evaluated before and after abrasion to determine gloss retention properties. Specifically, the release liner protecting the adhesive layer of the applique was removed, and the applique was applied to the appropriate surface of an S-36 Specimen Mounting Card (available from TABER® Industries, North Tonawanda, N.Y.) such that the adhesive layer of the applique contacted the mounting card, and hand pressure was used to remove any air bubbles and ensure intimate contact between the two surfaces. The opposite side of the specimen mounting card contained an adhesive layer with a protective release liner. This liner was removed and the specimen mounting card was laminated to a Tabor Abraser E-140-19 Specimen Holder using hand pressure. If a protective liner was present on the outer applique surface, it was carefully removed. After calibration to the dark standard provided, the initial gloss of the exposed applique surface was measured at four different points each for angles of 60° and 85° using a micro-TRI-gloss meter (manufactured by BYK-Gardner Incorporated, Silver Spring, Md.). The average and standard deviation were recorded. The exposed applique surface was then abraded using a Tabor 5130 Abraser equipped with a CS-10F wheel and a 500-gram load (manufactured by TELEDYNE TABER, North Tonawanda, N.Y.) for 25 cycles with a 100 percent vacuum. After abrasion, the gloss of the applique surface in the abraded area was measured, after calibration to the dark standard, at angles of 60° and 85° as described above. Gloss retention (percent) was calculated using the following formula: (abraded gloss/initial gloss)×100. The average values of initial and abraded gloss (which are unitless) were used in the calculations.

Removability

A 7.6 cm×11.4 cm×0.063 cm aluminum coupon (2024-T3, available from Q-Panel Lab Products) was washed three times with isopropyl alcohol prior to use. A sample of applique, having the PSA release liner removed, and having dimensions about 2.54 cm greater than that of the aluminum coupon was applied by hand to the cleaned panel. The applique was rubbed down by hand and the edges trimmed of excess applique. The applique-covered coupons were conditioned at 70° F. (21° C.) and 50 percent R.H. for at least 72 hours prior to testing. A corner edge of applique was loosened and, using thumb and forefinger, was peeled back at an angle of about 135° at a rate of about 12 inches/minute (30.5 cm/minute). The newly exposed coupon surface was examined by unaided eye for the presence of adhesive residue. A grade of "Pass" was assigned to those samples in which the whole applique was removed as one entire piece and left 5 percent or less by area of adhesive residue as estimated by an unaided eye.

Film Hardness

Applique-covered coupons were prepared as described above in "Removability". Film hardness was measured using ASTM D3363-92a. Gouge hardness was reported for the hardest pencil that left the film uncut for a stroke length of at least 3 mm. Scratch hardness was reported for the hardest pencil that did not rupture or scratch the film. A "Fail" was reported for those specimens that did not meet the requirements of the softest pencil hardness (Kimberly 525 6B, General Pencil Company, USA). That is, a grade of "Fail" indicates the film was too soft to give a hardness rating according to this test.

| Pencil Hardness Table (Kimberly 525, General Pencil Company, USA) | | | | | | | | | | | | | |
| --- | --- | --- | --- | --- | --- | --- | --- | --- | --- | --- | --- | --- | --- |
| 6B | 5B | 4B | 3B | 2B | B | HB | F | H | 2H | 3H | 4H | 5H | 6H |
| Softer | | | | | | | | | | | | | Harder |

Hydrocarbon Fluid Resistance

This test was used to evaluate the resistance of the appliques of the invention to hydrocarbon fluid, which is used as aviation fuel. Test samples of the appliques were prepared by punching three circular discs, each having an area of 2.85 $cm^2$, and immersing them in a container of Philjet® A Aviation Fuel with PFA 55-MB which was then sealed. The release liner was left on the adhesive layer. The exposed edges of the applique discs were not sealed prior to immersion. Each disc was removed after 14 days immersion at room temperature and, after the excess fluid was wiped off, tested using tweezers to determine if the edges of the exhibited signs of delamination of any of the layers. Discs were examined visually and those estimated to exhibit less than 5 percent edge lift along the entire edge were graded as "Pass". Discs which exhibited more than 5 percent edge lift, or exhibited signs of swelling or curling were all graded as "Fail". (In some cases the release liner delaminated from the adhesive layer. This did not constitute a grade of "Fail")

Hydraulic Fluid Resistance

This test was used to evaluate the resistance of the appliques of the invention to flame retardant hydraulic fluid. Samples were prepared and evaluated as described above in "Hydrocarbon Fluid Resistance" with the following modifications. A flame retardant hydraulic fluid, 57 Skydrol 500B-4 GL, was used in place of Philjet® A Aviation Fuel with PFA 55-MB, and the immersion time was 30 days. Each disc was then removed and, after the excess fluid was wiped off, evaluated.

The invention will be more fully appreciated with reference to the following non-limiting examples. All dimensions given in the test methods and the examples are nominal dimensions.

Example 1

An applique according to the invention was provided in the following manner. A premix acrylic syrup was prepared by combining together in a 4.0-liter glass jar 1550 grams of isooctyl acrylate (IOA), 172 grams of acrylic acid (AA), and 0.7 gram IRGACURE 651 photoinitiator. The jar was capped and a nitrogen source placed into the mixture through a hole in the cap. After purging with nitrogen for 10 minutes the mixture was gently swirled and exposed to ultraviolet (UV) irradiation using two 15 Watt blacklight bulbs (Sylvania Model F15T8/350BL) until a syrup having a visually estimated viscosity of about 1000 centipoise was obtained. The nitrogen purge and irradiation were then discontinued and 3.1 grams of hexanediol diacrylate (HDDA), 3.0 grams of 2,4-bis(trichloromethyl)-6-(3,4-dimethoxy)phenyl-s-triazine (3,4-DMT) and 3.4 grams of IRGACURE 651 were added to the premix syrup and dissolved therein by placing the combination, in a sealed jar, on a roller for 30 minutes to give the final acrylic syrup.

A gray fluoropolymer backing was prepared by feeding a uniform mixture of pellets having 97 percent (w/w) clear DYNEON THV 500 and 3 percent (w/w) of gray pigmented DYNEON THV 200 (this pigmented material was prepared by Americhem, Incorporated, Elgin, Ill., such that the color of the resultant gray backing met the specifications for Federal Standard 595B, Color #36320) into an extruder. The uniform mixture was extruded to a thickness of 88.9 $\mu$m+/−12 $\mu$m onto a smooth 51 $\mu$m thick polyester carrier web using a Haake extruder having a screw diameter of 1.9 cm and a die width of 20.3 cm, and employing a screw speed of 165 rpm and a web speed of 1.8 meters/minute. The extruder die was held approximately 1.9 cm away from the carrier. The extruder had three zones which were set at 224° C. in zone 1, 243° C. in zone 2, and 246° C. in zone 3; the die temperature was set at 246° C. Next, the top surface of the backing was treated by Acton Technologies, Inc., Pittston, Pa., using their FLUOROETCH process.

The final acrylic syrup was coated onto the etched surface of the fluoropolymer backing using a knife-over-bed coating station. The knife was locked in position to maintain a fixed gap of 76.2 $\mu$m greater than the combined thickness of the fluoropolymer backing and the carrier web employed. The syrup coated fluoropolymer backing was then cured by passing it through a 9.1 meter long UV irradiation chamber having bulbs mounted in the top which had a spectral output from 300 nanometers to 400 nanometers, with a maximum at 351 nanometers. The temperature setpoint was 15.5° C. and the bulbs were set at an intensity of 3.1 milliWatts/centimeter$^2$. The chamber was continuously purged with nitrogen. The web speed through the coating station and irradiation chamber was 4.6 meters/minute resulting in a total measured energy dosage of 368 milliJoules/centimeter$^2$ (National Institute of Standards and Technology (NIST) units). After irradiation from the adhesive side, the final combined thickness of the cured adhesive and backing was approximately 139.7 $\mu$m, indicating a cured adhesive thickness of about 50.8 $\mu$m. A 101.6 $\mu$m polyethylene release liner was then laminated onto the exposed side of the adhesive. Next, the polyester carrier web was removed and the second, opposing surface of the backing was treated by Acton Technologies, Inc. using their FLUOROETCH process.

A curable urethane paint coating or paint mixture was prepared by mixing 2 parts of AWL Grip® #2 High Solids Polyurethane Topcoat Gloss (a modified polyester resin; Product code: K line—lead free, color matched for K-7129, available from U.S. Paint Corporation, St. Louis, Mo.), and 1 part of Hi-Cat #85 L/F Converter for High Solids Topcoats (a modified polyisocyanate resin; Product code: K3002, available from U.S. Paint Corporation) in a 1 liter glass jar at about 75° F. (24° C.). The equivalent weight of the AWL Grip® #2 High Solids Polyurethane Topcoat Gloss (hydroxyl-containing component) was measured and found to be 1.8 milliequivalents/gram. The equivalent weight of the Hi-Cat #85 L/F Converter for High Solids Topcoats (isocyanate-containing component) was measured and found to be 4.5 milliequivalents/gram. The stoichiometric ratio of isocyanate:hydroxyl was 1.47:1.0. The curable urethane paint mixture was coated onto the etched surface opposite the adhesive coated surface using a knife-over-bed coating station. The knife was locked in position to maintain a fixed gap of 101.6 $\mu$m greater than the combined thickness of the fluoropolymer backing, cured adhesive and release liner. The urethane coating was then cured at about 75° F. (24° C.) and a relative humidity of 30 percent for 5 days. After curing of the sheet of applique, the total combined thickness of the urethane topcoat, fluoropolymer backing, adhesive, and release liner was 292.1 $\mu$m which indicated a cured urethane layer thickness of 50.8 $\mu$m. The applique sheet obtained was evaluated as described above. The results are shown in Table 1.

Comparative Example 1

Example 1 was repeated with the following modification. No urethane paint layer was employed. The applique obtained was evaluated for "Conformability", "Peel Adhesion Strength", "Removability", and "Film Hardness" as described above. The results are shown in Table 1.

Comparative Example 2

A blue fluoropolymer backing was prepared by extruding a uniform mixture of 90 percent (w/w) clear DYNEON THV 500 and 10 percent (w/w) of a proprietary blue pigmented DYNEON THV 200 (prepared by and available from Penn Color, Incorporated, Hatfield, Pa.). The uniform mixture of DYNEON THV 500 and pigmented DYNEON THV 200 was extruded to a thickness of 101.6 $\mu$m+/−12 $\mu$m onto a 127 $\mu$m thick polyester carrier web (available as TEKRA Type 561 Clear PET Film from Tekra Corporation, New Berlin, Wis.) using a Haake extruder having a screw diameter of 1.9 cm and a die width of 20.3 cm, and employing a screw speed of 165 rpm and a web speed of 1.8 meters/minute. The extruder die was held approximately 1.9 cm away from the carrier. The extruder had three zones which were set at 224° C. in zone 1, 243° C. in zone 2, and 246° C. in zone 3; the die temperature was set at 246° C. Next, the top surface of the backing was treated by Acton Technologies, Inc. using their FLUOROETCH process. A final acrylic syrup, prepared as described in Example 1, was coated onto the etched surface of the fluoropolymer backing and then irradiated as described in Example 1 to give a cured adhesive layer on the treated backing surface. The polyester carrier web was then removed and the color of the extruded fluoropolymer backing was measured on the exposed backing surface as described in ASTM D 2244-93 using a Hunterlab Ultrascan SE Colorimeter equipped with Universal Software, available from Hunterlab, Reston, Va. The color of the extruded backing had the following color parameters: L*=22.35, a*=−0.55, and b*=−6.29. This applique obtained was evaluated for "Conformability", "Gloss Retention", "Removability", and "Film Hardness" as described above. The results are shown in Table 1.

Comparative Example 3

Example 1 was repeated with the following modifications. The final acrylic syrup was coated onto a 101.6 $\mu$m polyethylene release liner and cured. The curable urethane paint mixture was coated onto a gray fluoropolymer backing which was prepared as described in Example 1, except without the FLUOROETCH treatment. The curable urethane paint layer was then cured at about 75° F. (22° C.) and a relative humidity of 30 percent for 5 days. Next, the release liner with adhesive was placed on the exposed surface of the cured urethane coating such that the adhesive was in contact with the coating. The final total thickness of the release liner, adhesive, urethane paint layer, and fluoropolymer backing, was 292.1 $\mu$m which indicated a cured urethane layer thickness of 50.8 μm. The fluoropolymer backing was then carefully removed to give a cured urethane paint film having a layer of acrylic pressure-sensitive adhesive on one side, and a protective release liner over the adhesive. This construction was evaluated, after removal of the release liner, for "Conformability", "Peel Adhesion Strength", "Removability", and "Film Hardness" as described above. The results are shown in Table 1.

TABLE 1

| Test Method | Example 1 | Comparative Example 1 | Comparative Example 2 | Comparative Example 3 |
|---|---|---|---|---|
| Conformability (Pass / Fail) | Pass | Pass | Pass | Fail |
| Peel Adhesion Method "A" (Newtons/100 mm) | 175.1 | 85.8 | N.D. | 82.3* |
| Peel Adhesion Method "B" (Newtons/100 mm) | 490.8 | 378.2 | N.D. | 136.1 |
| Initial Gloss | | | | |
| 60° angle | 94.5 ± 0.7 | N.D. | 62.9 ± 0.2 | N.D. |
| 85° angle | 98.2 ± 1.5 | N.D. | 94.7 ± 1.1 | N.D. |
| Abraded Gloss | | | | |
| 60° angle | 44.5 ± 9.4 | N.D. | 5.2 ± 0.3 | N.D. |
| 85° angle | 68.8 ± 4.5 | N.D. | 24.7 ± 5.8 | N.D. |
| Gloss Retention | | | | |
| 60° angle | 47.0% | N.D. | 8.3% | N.D. |
| 85° angle | 70.1% | N.D. | 26.1% | N.D. |
| Removability (Pass / Fail) | Pass | Pass | Pass | Fail |
| Film Hardness | | | | |
| Gouge Hardness | 5B | Fail | Fail | 6B |
| Scratch Hardness | 5B | Fail | Fail | 6B |

N.D. = not determined
*= sample broke

Example 2

A curable urethane paint mixture of Example 1 was coated onto a gray fluoropolymer backing which was prepared as described in Example 1, except without the FLUOROETCH treatment. The curable urethane paint layer was then cured at about 75° F. (24° C.) and a relative humidity of 30 percent for 5 days. The fluoropolymer backing was then carefully removed to give a cured urethane paint film. A 5.3 cm (downweb dimension)×22.5 cm (crossweb) specimen was cut out from the cured urethane paint film and the thickness was measured a total of 18 times along the center of the crossweb direction of the specimen every 1.2 cm. The thickness was measured using a Mitutoyo Digimatic Indicator, available from Mitutoyo Corporation, Minato-ku, Tokyo, Japan, equipped with a Starrett® AA Crystal Pink Granite Surface Plate meeting U.S. Federal Specification GGG-P-463C, available from L. S. Starrett Company, Athol, Mass. The average thickness was 52.1 μm±1.5 μm.

Example 3

Example 1 was repeated with the following modification. The curable urethane coating or paint mixture was prepared by mixing 2 parts of AWL Grip® #2 High Solids Polyurethane Topcoat Gloss, 1 part of Hi-Cat #85 L/F Converter for High Solids Topcoats, and 800 parts per million (ppm) of FASCAT™ 4202 catalyst (available from Atochem North America, Philadelphia, Pa.) in a 1 liter glass jar at about 75° F. (24° C.). The amount of catalyst was based on the combined weight of the "Polyurethane Topcoat Gloss" and the "Converter for High Solids Topcoats" components. The applique obtained was evaluated as described above for Example 1. The results are shown in Table 2.

Example 4

Example 1 was repeated with the following modifications. The curable urethane coating or paint mixture was prepared by mixing 2 parts DESOTHANE HS CA 8000 Base and 1 part of DESOTHANE HS CA 8000B Activator (both available from PRC-DeSoto International, Inc., a PPG Industries Company, Indianapolis, Ind.) with 500 ppm of FASCAT™ 4202 catalyst in a 1 liter glass jar at about 75° F. (24° C.). The amount of catalyst was based on the combined weight of the "Base" and the "Activator" components. The equivalent weight of the DESOTHANE HS CA 8000 Base (hydroxyl-containing component) was measured and found to be 1.2 milliequivalents/gram. The equivalent weight of the DESOTHANE HS CA 8000B Activator (isocyanate-containing component) was measured and found to be 4.5 milliequivalents/gram. The stoichiometric ratio of isocyanate:hydroxyl was 2.08:1.0. The applique obtained was evaluated as described above for Example 1. The results are shown in Table 2.

Example 5

Example 3 was repeated with the following modifications. The curable urethane coating or paint mixture was prepared in a 3.8 liter can at about 75° F. (24° C.) using 100 ppm catalyst. The curable urethane paint mixture was coated onto the etched surface of the backing, opposite the adhesive coated surface, using a knife-over-roll coating station in a roll-to-roll process. The curable urethane-coated backing was then passed through a four zone oven. The setpoints of each zone were as follows: zone 1 (4.6 meters long)=100° F. (38° C.); zone 2 (4.6 meters long)=160° F. (71° C.); zone 3 (4.6 meters long)=220° F. (105° C.); and zone 4 (9.1 meters long)=225° F. (107° C.). These settings provided actual zone temperatures of approximately 100° F. (38° C.), 152° F. (67° C.), 212° F. (100° C.), and 238° F. (114° C.) respectively. The knife was locked in position to maintain a fixed gap of 152.5 μm greater than the combined thickness of the fluoropolymer backing, cured adhesive and release liner. The line speed for the coating and curing process was 1.83 meters/minute. The urethane coating was deemed sufficiently cured to permit windup of the applique obtained into a roll form with a polyethylene protective sheet over the cured urethane coating layer. After curing, the total combined thickness of the urethane topcoat, fluoropolymer backing, adhesive, and release liner was 294.6 μm±5.1 μm which indicated a cured urethane layer thickness of about 75 μm. The applique obtained was evaluated as described above for Example 1 with the following modification. The "Gouge Hardness" was measured both immediately after coating and curing, as well as after storage in the roll form at about 75° F. (24° C.) and a relative humidity of 30 percent for 14 days. The results are shown in Table 2.

Example 6

Example 4 was repeated with the following modification. The FASCAT™ 4202 catalyst was not used. The applique obtained was evaluated as shown below in Tables 2 and 3.

TABLE 2

| Test Method | Example 1 | Example 3 | Example 4 | Example 5 | Example 6 |
|---|---|---|---|---|---|
| Conformability (Pass / Fail) | Pass | Pass | Pass | Pass | Pass |
| Peel Adhesion Method "A" (Newtons/100 mm) | 175.1 | N.D. | N.D. | 163.2 | N.D. |
| Peel Adhesion Method "B" (Newtons/100 mm) | 490.8 | N.D. | N.D. | 194.8 | N.D. |
| Initial Gloss | | | | | |
| 60° angle | 94.5 ± 0.7 | 76.6 ± 0.6 | 72.0 ± 0.5 | 87.1 ± 0.1 | 93.4 ± 0.4 |
| 85° angle | 98.2 ± 1.5 | 88.1 ± 0.7 | 89.9 ± 0.6 | 98.5 ± 3.8 | 97.5 ± 2.9 |
| Abraded Gloss | | | | | |
| 60° angle | 44.5 ± 9.4 | 23.0 ± 1.2 | 41.1 ± 1.6 | 36.7 ± 5.2 | 54.7 ± 1.0 |
| 85° angle | 68.8 ± 4.5 | 64.7 ± 0.8 | 73.8 ± 1.6 | 83.5 ± 1.8 | 80.3 ± 0.3 |
| Gloss Retention | | | | | |
| 60° angle | 47.0% | 30.0% | 57.1% | 42.1% | 58.6% |
| 85° angle | 70.1% | 73.4% | 82.1% | 84.8% | 82.4% |
| Removability (Pass / Fail) | Pass | Pass | Pass | Pass | Pass |
| Film Hardness | | | | | |
| Gouge Hardness | 5B | 6B | 6B | 5B* | 6B |
| Scratch Hardness | 5B | 6B | 6B | 5B* | 6B |

N.D. = not determined
*= Hardness value obtained both initially and after 5 days as described in Example 5.

Example 7

Example 6 was repeated with the following modification. A weight ratio of 2.0:0.75 Base:Activator was employed. This resulted in a stoichiometric ratio of isocyanate:hydroxyl of 1.56:1.0. The applique obtained was evaluated conformability, initial gloss, abraded gloss, gloss retention, removability, film hardness, and fluid resistance as described above. The results are shown in Table 3.

Example 8

Example 6 was repeated with the following modification. A weight ratio of 2.0:0.50/Base:Activator was employed. This resulted in a stoichiometric ratio of isocyanate:hydroxyl of 1.04:1.0. The applique obtained was evaluated for conformability, initial gloss, abraded gloss, gloss retention, removability, film hardness, and fluid resistance as described above. The results are shown in Table 3.

Example 9

Example 6 was repeated with the following modification. A weight ratio of 2.0:0.25/Base:Activator was employed. This resulted in a stoichiometric ratio of isocyanate:hydroxyl of 0.52:1.0. The applique obtained was evaluated for conformability, initial gloss, abraded gloss, gloss retention, removability, film hardness, and fluid resistance as described above. The results are shown in Table 3.

TABLE 3

| Test Method | Example 6 | Example 7 | Example 8 | Example 9 |
|---|---|---|---|---|
| Stoichiometric Ratio(NCO:OH) | 2.08:1.0 | 1.56:1.0 | 1.04:1.0 | 0.52:1.0 |
| Conformability (Pass / Fail) | Pass | Pass | Pass | Pass |
| Initial Gloss | | | | |
| 60° angle | 93.4 ± 0.4 | 92.8 ± 3.1 | 91.8 ± 0.2 | 89.6 ± 1.0 |
| 85° angle | 97.5 ± 2.9 | 96.5 ± 1.5 | 97.3 ± 1.3 | 93.3 ± 1.4 |
| Abraded Gloss | | | | |
| 60° angle | 54.7 ± 1.0 | 42.5 ± 7.3 | 72.7 ± 7.6 | 38.3 ± 1.3 |
| 85° angle | 80.3 ± 0.3 | 80.6 ± 6.3 | 83.2 ± 1.1 | 63.1 ± 0.1 |
| Gloss Retention | | | | |
| 60° angle | 58.6% | 45.8% | 79.2% | 42.8% |
| 85° angle | 82.4% | 83.5% | 85.5% | 67.6% |
| Removability (Pass / Fail) | Pass | Pass | Pass | Pass |
| Film Hardness | | | | |
| Gouge Hardness | 6B | 6B | 6B | Fail |
| Scratch Hardness | 6B | 6B | 6B | Fail |
| Hydrocarbon Fluid Resistance (Pass / Fail) | Pass | Pass | Pass | Pass |
| Hydraulic Fluid Resistance (Pass / Fail) | Pass | Pass | Pass | Fail |

All patents, patent applications, and publications cited herein are each incorporated by reference, as if individually incorporated. The various modifications and alterations of this invention will be apparent to those skilled in the art without departing from the scope and spirit of this invention. This invention should not be restricted to that set forth herein for illustrative purposes.

What is claimed is:

1. An applique comprising:
   a backing comprising a fluorinated polymer having two treated surfaces, an adhesive layer on one treated surface and a cured urethane coating layer on the other treated surface.

2. An airplane comprising an outer surface and an applique thereon, wherein the applique comprises the applique of claim 1.

3. The applique of claim 1 wherein the cured urethane coating layer further comprises a colorant.

4. The applique of claim 1 wherein the adhesive is a pressure-sensitive adhesive.

5. The applique of claim 4 wherein the adhesive comprises an acrylate copolymer.

6. The applique of claim 5 wherein the acrylate copolymer comprises copolymerized monomers comprising at least one monofunctional alkyl (meth)acrylate monomer and at least one monofunctional free-radically copolymerizable acid-containing reinforcing monomer whose homopolymer glass transition temperature is higher than that of the alkyl (meth) acrylate homopolymer.

7. The applique of claim 1 wherein the applique has a gloss retention of greater than or equal to 10 percent as measured at an angle of 60° with respect to the applique surface and greater than or equal to 30 percent as measured at an angle of 85° with respect to the applique surface for glossy and semi-glossy surfaces.

8. The applique of claim 7 wherein the applique has an initial gloss of at least 35 measured at an angle of 60° with respect to the applique surface.

9. The applique of claim 1 wherein the cured urethane coating layer has a stoichiometric ratio of isocyanate equivalents: hydroxyl equivalents of from 2.1:1 to 0.5:1 prior to curing.

10. The applique, of claim 9 wherein the cured urethane coating layer contains a catalyst.

11. The applique of claim 1 wherein the backing is treated by corona treatment, chemical etch, or with a primer.

12. The applique of claim 1 adhered to a substrate.

13. The applique of claim 12 wherein the substrate comprises an aluminum surface.

14. The applique of claim 1 wherein the applique has a peel strength of at least about 30 N/100 mm at room temperature after being applied to an aluminum substrate and immersed in a hydrocarbon fluid for 14 days at room temperature.

15. The applique of claim 14 wherein the applique further has a peel strength of at least about 25 N/100 mm at room temperature after being applied to an aluminum substrate and immersed in a phosphate ester hydraulic fluid for 30 days at room temperature.

16. An applique comprising:
   a backing comprising a fluorinated polymer that is not perfluorinated having two treated surfaces, an adhesive layer on one treated surface and a cured urethane coating layer on the other treated surface.

17. The applique of claim 16 wherein the cured urethane coating layer further comprises a colorant.

18. The applique of claim 16 wherein the adhesive is a pressure-sensitive adhesive.

19. The applique of claim 18 wherein the adhesive comprises an acrylate copolymer.

20. The applique of claim 19 wherein the acrylate copolymer comprises copolymerized monomers comprising at least one monofunctional alkyl (meth)acrylate monomer and at least one monofunctional free-radically copolymerizable acid-containing reinforcing monomer whose homopolymer glass transition temperature is higher than that of the alkyl (meth)acrylate homopolymer.

21. The applique of claim 16 wherein the applique has a gloss retention of greater than or equal to 10 percent as measured at an angle of 60° with respect to the applique surface and greater than or equal to 30 percent as measured at an angle of 85° with respect to the applique surface for glossy and semi-glossy surfaces.

22. The applique of claim 21 wherein the applique has an initial gloss of at least 35 when measured at angle of 60° with respect to the applique surface.

23. The applique of claim 16 wherein the cured urethane coating layer has a stoichiometric ratio of isocyanate equivalents: hydroxyl equivalents of from 2.1:1 to 0.5:1 prior to curing.

24. The applique of claim 23 wherein the cured urethane coating layer contains a catalyst.

25. The applique of claim 16 wherein the backing is treated by corona treatment, chemical etch, or with a primer.

26. The applique of claim 16 adhered to a substrate.

27. The applique of claim 26 wherein the substrate comprises an aluminum surface.

* * * * *